ID=patent_3342816

United States Patent Office 3,342,816
Patented Sept. 19, 1967

3,342,816
CYCLOPROPYLPIPERAZINOALKYL-
PHENOTHIAZINES
Jack Mills and Charles W. Ryan, Indianapolis, Ind., assignors to Eli Lilly and Company, Indianapolis, Ind., a corporation of Indiana
No Drawing. Filed June 1, 1965, Ser. No. 460,577
6 Claims. (Cl. 260—243)

This invention relates to novel derivatives of phenothiazine. More specifically, this invention relates to derivatives of phenothiazine having a cyclopropylpiperazinoalkyl substituent in the 10-position.

The use of various derivatives of phenothiazine has become well established in the treatment of mental disturbances because of the pronounced tranquilizing effect produced by these drugs. Such compounds have also been employed for their anti-emetic effect. The phenothiazine derivatives would become even more important therapeutic agents if their duration of action could be prolonged so as to make possible a longer interval between doses.

It is an object of this invention to provide derivatives of phenothiazine having excellent tranquilizing and anti-emetic effectiveness. It is a further object of the invention to provide such compounds having a surprisingly prolonged duration of action. Still another object of the invention is the provision of novel intermediates useful in the preparation of the compounds of the invention.

In accordance with the invention there are provided novel derivatives of phenothiazine of the formula

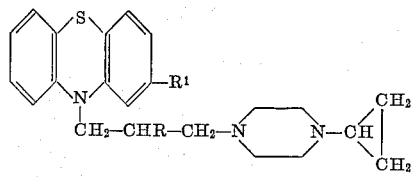

wherein R is hydrogen or methyl and $R^1$ is chloro, trifluoromethyl, methoxy or methylthio.

The compounds of the invention can be prepared by conventional processes well known in the art by employing known phenothiazines with certain novel intermediates. The provision of such novel intermediates constitutes a further feature of the invention. The said novel intermediates are derivatives of piperazine and can be represented by the formula

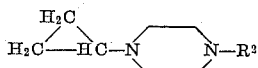

in which $R^2$ is H or —$CH_2$—CHR—$CH_2$—X, wherein R has the above assigned meaning and X is hydroxy or chloro.

Preparation of the novel cyclopropylpiperazine intermediates employed in this invention can be accomplished by known procedures. Thus, for example, the reaction of N,N - bis($\beta$ - chloroethyl) - p - toluenesulfonamide with cyclopropylamine by heating the solution of the reactants under pressure yields 1 - cyclopropyl - 4 - p - toluenesulfonylpiperazine. Hydrolysis, under acidic conditions, affords 1-cyclopropylpiperazine in good yields. Other approaches to the preparation of cyclopropylpiperazine intermediates may also be employed. Thus, for example, cyclopropylamine can be caused to react with ethylene oxide to yield N,N - bis($\beta$-hydroxyethyl)cyclopropylamine. This product can readily be converted to the corresponding $\beta$-chloroethyl compound by reaction with thionyl chloride or by other conventional means for replacing an aliphatic hydroxyl substituent by a halogen. Cyclization of the chloro derivative can be effected by reaction with an appropriate amine. Thus, the N,N - bis($\beta$ - chloroethyl) cyclopropylamine, by heating with 3-amino-1-propanol, can be converted to 3 - (4 - cyclopropylpiperazino)-1-propanol. This compound, in turn, can be converted to the corresponding chloro derivative by reaction with thionyl chloride, phosphorous oxychloride or the like.

A number of synthetic routes to the desired 10 - cyclopropylpiperazinoalkylphenothiazines can be utilized. One such method employs the reaction of an appropriately substituted phenothiazine with 3 - (4 - cyclopropylpiperazino)propyl chloride in the presence of lithium amide, sodium amide or the like to give the desired 10-cyclopropylpiperazinoalkylphenothiazine directly.

An alternative approach employs 10-(3-chloropropyl) substituted phenothiazines as intermediates. Such derivatives are readily prepared from suitable phenothiazines by the reaction of trimethylene chlorobromide with an alkali metal derivative of the phenothiazine. The desired end product is readily obtained in excellent yield from this intermediate by reaction with cyclopropylpiperazine.

Still another approach to the 10-cyclopropylpiperazinoalkylphenothiazines proceeds from the corresponding phenothiazinyl 10-carbonyl chloride, the preparation of which is known in the art. Reaction of this intermediate with 3 - (4 - cyclopropylpiperazino)propanol produces the expected carbamate, which upon heating loses carbon dioxide to give the desired 10 - cyclopropylpiperazinoalkylphenothiazine.

It is likewise possible to build the piperazino ring structure from a side chain already attached to the desired phenothiazine. Thus, for example, 2 - chloro - 10 - [3-(N,N - bis - 2 - chloroethyl)aminopropyl]phenothiazine can be heated with cyclopropylamine under pressure to give 2 - chloro - 10 - [3 - (4 - cyclopropylpiperazino) propyl]phenothiazine.

The corresponding compounds with a methyl group substituted in the 2-position of the propyl side chain can be prepared by identical procedures using the appropriately substituted intermediates. As an example, N,N - bis ($\beta$-chloroethyl)cyclopropylamine can be prepared as described above from cyclopropylamine and ethylene oxide and conversion of the bis-$\beta$-hydroxyethyl compound so formed to the corresponding chloro derivative. By heating the N,N - bis($\beta$ - chloroethyl)cyclopropylamine with 2-methyl - 3 - amino - 1 - propanol, good yields of 2-methyl - 3 - (4 - cyclopropylpiperazino) - 1 - propanol are obtained. It will be apparent to those skilled in the art that many of the other synthetic procedures described can be adapted to yield methyl-substituted derivatives by employing suitable methyl-substituted intermediates.

The compounds of the present invention possess numerous advantages over the known phenothiazine derivatives. Thus, for example, the compounds are not only highly effective tranquilizing and anti-emetic agents but exhibit these properties at very low doses and maintain their activity in the body for prolonged periods of time. A further important effect of the compounds lies in their ability to potentiate the action of anticholingeric compounds in inhibiting gasteric secretion. Moreover, some of the compounds significantly inhibit acid secretion when used alone.

In order that the practice of the invention may be more readily understood, the following examples are provided by way of illustrations. It is to be understood, however, that many modifications will be apparent to those skilled in the art, and these are to be considered within the spirit and scope of the invention.

PREPARATION OF 10-(3-CHLOROPROPYL)-2-TRIFLUOROMETHYLPHENOTHIAZINE

Twenty grams of 2-trifluoromethylphenothiazine were added with stirring to about 500 ml. of liquid ammonia containing lithium amide freshly prepared from 0.6 g. of lithium. After one hour, 12.5 g. of 1-chloro-3-bromopropane were added dropwise. Stirring was continued until the ammonia evaporated. A small amount of water was added cautiously to the residue and the mixture was then extracted with ether. The ether extracts were dried and evaporated and the residue was distilled to give 10-(3 - chloropropyl)-2-trifluoromethylphenothiazine, boiling at about 180° C. at about 0.5 mm. Additional purification was achieved by recrystallizing the product from methylcyclohexane to give white crystalline material melting at about 70–72° C.

*Analysis.*—Calc.: C, 55.89; H, 3.81; N, 4.07. Found: C, 55.89; H, 3.85; N, 4.04.

By employing the above described procedure with the appropriate phenothiazine, the following compounds were also prepared:

10-(3-chloropropyl) - 2 - chlorophenothiazine from 2-chlorophenothiazine.

10-(3-chloropropyl)-2-methoxyphenothiazine from 2-methoxyphenothiazine.

10-(3-chloropropyl) - 2 - methylthiophenothiazine from 2-methylthiophenothiazine.

*Example 1*

A solution of 20 g. of N,N-bis(β-chloroethyl)-p-toluenesulfonamide and 20 g. of cyclopropylamine in 25 ml. of ethanol was heated in a pressure bomb at about 130° C. for about seven hours. After the bomb and its contents had been allowed to cool, the reaction mixture was removed and concentrated under reduced pressure. The residue was slurried with water and the solid product was recovered by filtration. Recrystallization from alcohol yielded product melting at about 136–138° C.

*Analysis.*—Calc.: C, 59.97; H, 7.18; N, 9.99. Found: C, 60.55; H, 7.39; N, 9.13.

*Example 2*

A mixture of 10 g. of 1-cyclopropyl-4-p-toluenesulfonylpiperazine, 12 ml. of concentrated sulfuric acid and 10 ml. of acetic acid were heated on the steam bath for about two hours. The reaction mixture was cooled, poured onto ice and made strongly basic with aqueous ammonium hydroxide. The basic mixture was extracted five times with 25-ml. portions of chloroform and the chloroform extracts were combined and dried over anhydrous potassium carbonate. The solvent was evaporated on the steam bath and the residue distilled under reduced pressure to give cyclopropylpiperazine boiling at about 43° C. at 7 mm.; $n_D^{25}$ 1.4804.

*Analysis.*—Calc.: C, 66.62; H, 11.18; N, 22.20. Found: C, 66.43; H, 11.26; N, 21.92.

*Example 3*

A solution of 11.4 g. of cyclopropylamine and 25 ml. of ethylene oxide in 50 ml. of methanol was allowed to stand overnight at room temperature in a pressure bottle. After removal of the solvents and unreacted reagents, the residue was distilled to give N,N-bis(β-hydroxyethyl)-cyclopropylamine boiling at about 103–107° C. at 1 mm.

*Analysis.*—Calc.: C, 57.90; H, 10.41; N, 9.65. Found: C, 57.95; H, 10.59; N, 9.67.

A solution of 10 g. of N,N-bis(β-hydroxyethyl)cyclopropylamine in a solvent mixture of 50 ml. of benzene and 50 ml. of chloroform was stirred while 20 g. of thionyl chloride were added dropwise. Stirring was continued overnight. The reaction mixture was concentrated and the residue was dissolved in warm acetone from which the product crystallized. An additional recrystallization from acetone afforded N,N-bis(β-chloroethyl)cyclopropylamine hydrochloride melting at about 132–134°C.

A solution of 68 g. of N,N-bis(β-chloroethyl)cyclopropylamine, 28 g. of 3-amino-1-propanol and 75 ml. of triethylamine in 100 ml. of ethanol was heated under reflux overnight. The solution was cooled and the precipitated triethylamine hydrochloride was separated by filtration. The gummy residue remaining after concentration of the filtrate was extracted and the benzene extracts were combined and dried. Removal of the solvent in vacuo and distillation of the residue provided 3-(4-cyclopropylpiperazino)-1-propanol distilling at about 128–130° C. at about 7 mm.

*Analysis.*—Calc.: C, 65.17; H, 10.94; N, 15.20. Found: C, 65.33; H, 11.11; N, 15.26.

*Example 4*

Dry hydrogen chloride was passed into a solution of 11 g. of 3-(4-cyclopropylpiperazino)-1-propanol in 100 ml. of chloroform. After the addition of 20 ml. of thionyl chloride, the reaction mixture was heated under reflux with stirring overnight. The solvent was removed in vacuo and the crystalline residue was diluted with ethanol and reconcentrated. The residue was slurried with acetone and the solid was separated by filtration, dissolved in water, overlayered with ether and treated with 20 percent aqueous sodium hydroxide until the aqueous layer was basic. The ether layer was separated, dried and concentrated and the residue was distilled to give 3-(4-cyclopropylpiperazino)-1-propyl chloride boiling at about 110–112° C. at about 7 mm.

*Analysis.*—Calc.: C, 59.24; H, 9.44; N, 13.82. Found: C, 59.30; H, 9.58; N, 13.53.

By employing the above procedure with 3-(4-cyclopropylpiperazino)-2-methyl-1-propanol, 3-(4 - cyclopropylpiperazino)-2-methyl-1-propyl chloride is obtained.

*Example 5*

A solution of 20.8 g. of 10-(3-chloropropyl)-2-trifluoromethylphenothiazine, 8.6 g. of N-cyclopropylpiperazine and 10 g. of triethylamine was heated on the steam bath for about 24 hours. The reaction mixture was poured into water and ether and the ether layer was separated and extracted several times with dilute hydrochloric acid. The combined acid extracts were made basic with 20 percent aqeous sodium hydroxide and the separated crude free amine was extracted with ether. The ether extracts were combined, dried over anhydrous potassium carbonate and evaporated to remove the ether. The residue was dissolved in absolute ethanol and the ethanol solution was made strongly acidic by the addition of dry hydrogen chloride in ethanol. The product which precipitated from the solution was collected by filtration and washed with a little cold ethanol. Recrystallization from ethanol afforded 10-[3-(4 - cyclopropylpiperazino)propyl]-2-trifluoromethylphenothiazine dihydrochloride melting at about 210–215° C.

*Analysis.*—Calc.: C, 54.34; H, 5.57; N, 8.30. Found: C, 54.90; H, 6.00; N, 8.02.

By the procedure described in the preceding paragraph, the following phenothiazine derivatives were also prepared:

10[3 - (4-cyclopropylpiperazino)propyl] - 2 - chlorophenothiazine dihydrochloride melting at about 217–219° C.

*Analysis.*—Calc.: C, 55.87; H, 5.96; N, 8.89. Found: C, 55.75; H, 6.02; N, 8.86.

10-[3-(4-cyclopropylpiperazino)propyl] - 2-methylthiophenothiazine dihydrochloride melting at about 204–207° C.

*Analysis.*—Calc.: C, 57.01; H, 6.44; N, 8.67. Found: C, 57.09; H, 6.73; N, 8.41.

10-[3-(4-cyclopropylpiperazino)propyl] - 2 - methoxyphenothiazine dihydrochloride melting at about 228–234° C.

*Analysis.*—Calc.: C, 58.96; H, 6.66; N, 8.97. Found: C, 58.33; H, 6.91; N, 8.60.

10-[3-(4-cyclopropylpiperazino) - 2 - methylpropyl]-2-chlorophenothiazine dihydrochloride, M.P. about 171° C.

*Analysis.*—Calc.: C, 56.73; H, 6.21; N, 8.63. Found: C, 57.25; H, 6.60; N, 8.34.

10-[3-(4-cyclopropylpiperazino) - 2 - methylpropyl]-2-trifluoromethylphenothiazine dihydrochloride, M.P. about 170° C.

10-[3-(4-cyclopropylpiperazino) - 2 - methylpropyl] - 2-methoxyphenothiazine dihydrochloride, M.P. about 212–215° C.

*Example 6*

A mixture of 10 g. of 2-chlorophenothiazine, 1.6 g. of sodium amide and 200 ml. of xylene was heated under reflux with stirring for about two hours. A solution of 8 g. of 3-(4-cyclopropylpiperazino)propyl chloride in 50 ml. of xylene was added dropwise. Stirring and heating were continued for an additional two hours and the reaction mixture was then allowed to cool. The reaction mixture was washed with water and the xylene layer was then extracted with dilute hydrochloric acid. The combined acid extracts were made basic by the addition of 20 percent aqueous sodium hydroxide solution to liberate the free amine. The basic mixture was extracted twice with ether and the ether extracts were combined, dried with anhydrous potassium carbonate and concentrated. The residue was dissolved in ethanol and the ethanol solution was acidified by the addition of anhydrous hydrogen chloride in ethanol. The acidified ethanol solution was chilled thoroughly to bring about crystallization of the dihydrochloride salt. The crystals were collected by filtration, washed with a little cold ethanol and vacuum dried to give 10-[3-(4-cyclopropylpiperazino)propyl]-2-chlorophenothiazine dihydrochloride melting at about 210–212° C.

*Example 7*

A solution of 10.2 g. of 2-chloro-10-[3-N,N-bis(2-chloroethyl)aminopropyl]phenothiazine hydrochloride and 13.7 g. of cyclopropylamine in 100 ml. of ethanol was heated in a pressure bomb for about eight hours at about 130° C. The reaction mixture, after cooling, was removed from the bomb and the ethanol was removed by distillation in vacuo. The residue was dissolved in ether and the ether solution was extracted with dilute hydrochloric acid. The product was recovered from the acid extracts by the procedure described in Example 6.

*Example 8*

A solution of 10 g. of 3-(4-cyclopropylpiperazino)-1-propanol, 15.5 g. of 2-chloro-10-phenothiazinylcarbonyl chloride and 10 g. of triethylamine was heated overnight on a steam bath. The reaction mixture was cooled and extracted with dilute hydrochloric acid, the acidic extracts were made basic with 20 percent aqueous sodium hydroxide and the free amine was extracted with ether. The ether extracts were dried over anhydrous magnesium sulfate and evaporated, and the residue was recrystallized from methylclohexane to give 3-(4-cyclopropylpiperazino)propyl 2-chloro-10-phenothiazine carboxylate melting at about 98–100° C.

*Analysis.*—Calc.: C, 62.21; H, 5.90; N, 9.46. Found: C, 62.30; H, 6.18; N, 9.28.

Two grams of the above carbamate were heated on an oil bath for four hours at about 170–180° C. The reaction mixture was cooled and dissolved in ether and the ether solution was extracted with dilute hydrochloric acid. The acid extract was made basic with 20 percent aqueous sodium hydroxide and the free amine was extracted with ether. The ether extracts were dried over anhydrous magnesium sulfate and concentrated, and the residue was dissolved in ethanol. The ethanol solution was acidified by the addition of an ether-alcohol solution of anhydrous hydrogen chloride. The salt which precipitated was collected by filtration, washed with a little cold alcohol and dried in vacuo. The 10-[3-(4-cyclopropylpiperazino)-propyl] - 2 - chlorophenothiazine dihydrochloride so obtained melted at about 207–211° C.

We claim:
1. A compound of the formula

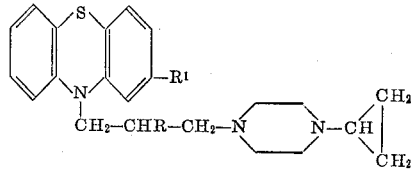

wherein
   $R^1$ is selected from the group consisting of chloride, trifluoromethyl, methoxy, and methylthio; and
   R is selected from the group consisting of hydrogen and methyl
and an acid addition salt thereof with a pharmaceutically acceptable acid.

2. 10-[3-(4-cyclopropylpiperazino)propyl] - 2-trifluoromethylphenothiazine.

3. 10-[3-(4-cyclopropylpiperazino)propyl] - 2 - chlorophenothiazine.

4. 10 - [3-(4-cyclopropylpiperazino)propyl] - 2-methoxyphenothiazine.

5. 10-[3-(4-cyclopropylpiperazino) - 2-methylpropyl]-2-trifluoromethylphenothiazine.

6. 10-[3-(4-cyclopropylpiperazino) - 2-methylpropyl]-2-chlorophenothiazine.

No references cited.

WALTER A. MODANCE, *Primary Examiner.*

H. I. MOATZ, *Assistant Examiner.*